(12) United States Patent
O'Mahony

(10) Patent No.: US 10,890,285 B2
(45) Date of Patent: Jan. 12, 2021

(54) HIGH PRESSURE HOSE COUPLER

(71) Applicant: James O'Mahony, Ballinhassig (IE)

(72) Inventor: James O'Mahony, Ballinhassig (IE)

( * ) Notice: Subject to any disclaimer, the term of this patent is extended or adjusted under 35 U.S.C. 154(b) by 288 days.

(21) Appl. No.: 16/082,125

(22) PCT Filed: Mar. 7, 2017

(86) PCT No.: PCT/EP2017/055295
§ 371 (c)(1),
(2) Date: Sep. 4, 2018

(87) PCT Pub. No.: WO2017/153390
PCT Pub. Date: Sep. 14, 2017

(65) Prior Publication Data
US 2019/0063650 A1    Feb. 28, 2019

(30) Foreign Application Priority Data

Mar. 9, 2016  (IE) ...................... 2016/0074

(51) Int. Cl.
*F16L 33/24* (2006.01)
*F16L 33/22* (2006.01)
(52) U.S. Cl.
CPC .............. *F16L 33/24* (2013.01); *F16L 33/22* (2013.01); *F16L 33/223* (2013.01)
(58) Field of Classification Search
CPC . F16L 33/22; F16L 33/24; F16L 33/18; F16L 33/213; F16L 33/223; F16L 33/224; F16L 13/147; F16L 33/2073; F16L 33/2078; F16L 33/2076
USPC .......................... 285/251, 248, 247, 258, 259
See application file for complete search history.

(56) References Cited

U.S. PATENT DOCUMENTS

| 228,161 A | * | 6/1880 | Adlam ................... F16L 33/213 |
| | | | 285/258 |
| 1,185,215 A | * | 5/1916 | Lezzeni ................... F16L 33/24 |
| | | | 285/245 |
| 1,186,722 A | * | 6/1916 | Young ..................... F16L 33/24 |
| | | | 285/245 |

(Continued)

FOREIGN PATENT DOCUMENTS

CN    203082417 U    7/2013
EP    0 369 834 A1    5/1990

OTHER PUBLICATIONS

International Search Report issued in PCT/EP2017/055295; dated Jun. 21, 2017.

*Primary Examiner* — Aaron M Dunwoody
(74) *Attorney, Agent, or Firm* — Studebaker & Brackett PC

(57) ABSTRACT

A high pressure hose coupler has a tubular connector having internal threads at a distal end for engaging a hose around the hose's external surface. These teeth grip into the hose's outer soft layer, and the hose it typically steel-reinforced. An internal collet fits inside the hose, and engages the connector at a proximal end to be retained in place. A hollow insert has a distal end configured to be inserted within the collet to press the collet radially outwardly so that the hose wall is pressed between the connector and the collet. The insert proximal end is configured to engage the collet at threads on collet internal threads. The hose is gripped very tightly by action of the insert pressing against the tapered collet, in turn against the restraining force of the connector around the end of the hose.

25 Claims, 5 Drawing Sheets

(56) References Cited

U.S. PATENT DOCUMENTS

| | | | | |
|---|---|---|---|---|
| 1,228,549 A | * | 6/1917 | Furdy | F16L 33/24 285/245 |
| 1,235,876 A | * | 8/1917 | Cave | F16L 33/223 285/247 |
| 2,071,478 A | * | 2/1937 | Wick | F16L 33/213 285/258 |
| 2,228,018 A | * | 1/1941 | Scholtes | F16L 33/213 285/222.4 |
| 2,550,583 A | * | 4/1951 | Millar | F16L 33/213 285/258 |
| 3,211,476 A | * | 10/1965 | Wagner | F16L 33/213 285/258 |
| 3,490,793 A | * | 1/1970 | Wagner | F16L 33/213 285/93 |
| 4,006,923 A | * | 2/1977 | Wagner | F16L 33/213 285/39 |
| 4,224,464 A | | 9/1980 | Bunnell et al. | |
| 4,773,678 A | * | 9/1988 | Canaud | F16L 33/23 285/39 |
| 5,050,912 A | * | 9/1991 | Hayasaka | F16L 5/02 285/214 |
| 5,240,291 A | | 8/1993 | Zornow | |
| 9,022,431 B2 | * | 5/2015 | Furst | F16L 19/086 285/259 |
| 2004/0245776 A1 | * | 12/2004 | Evans | F16L 33/223 285/259 |
| 2005/0061500 A1 | * | 3/2005 | Dodd | F16L 33/213 166/242.2 |
| 2009/0026760 A1 | | 1/2009 | Henry | |

* cited by examiner

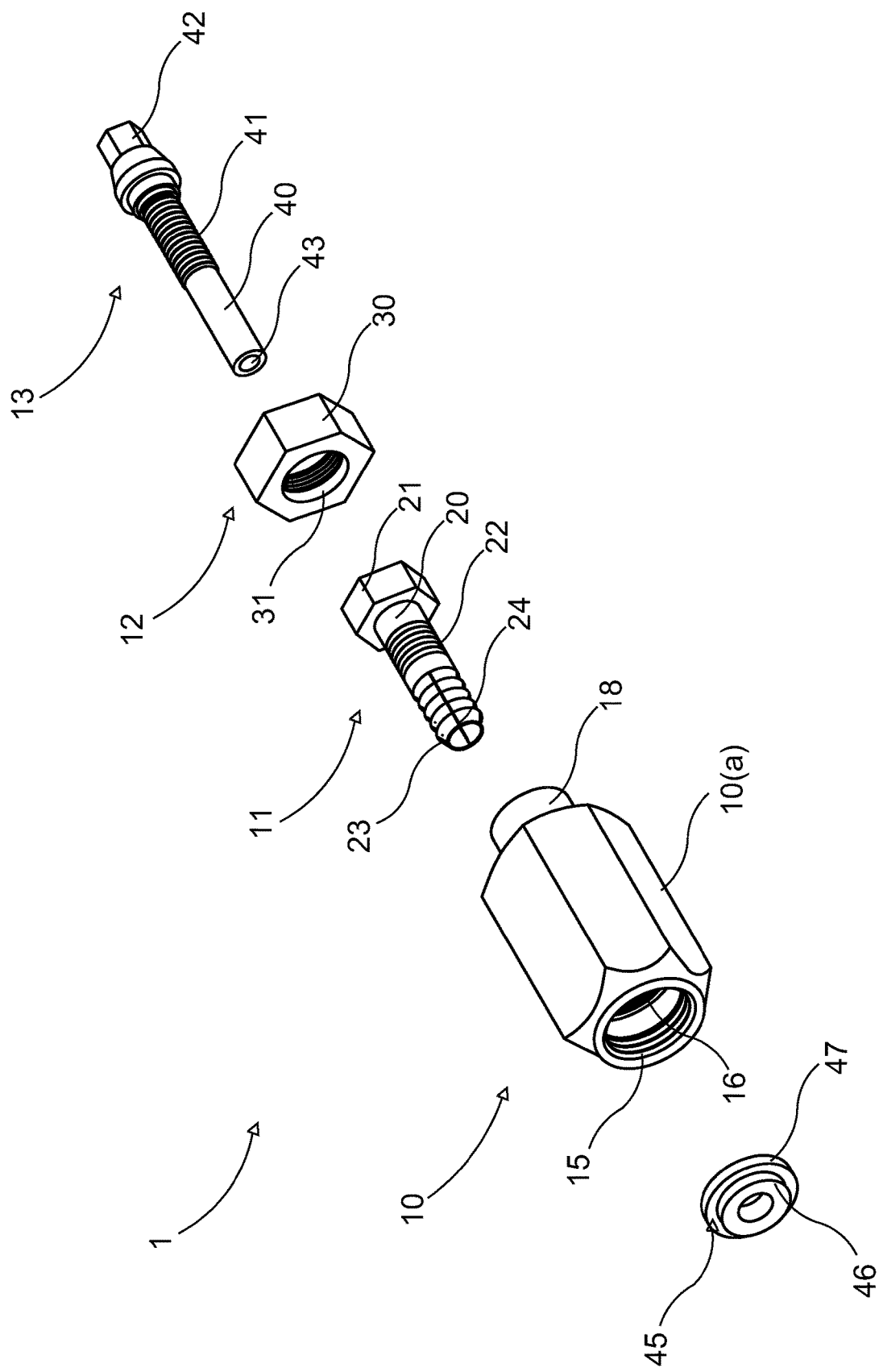
Fig: 1

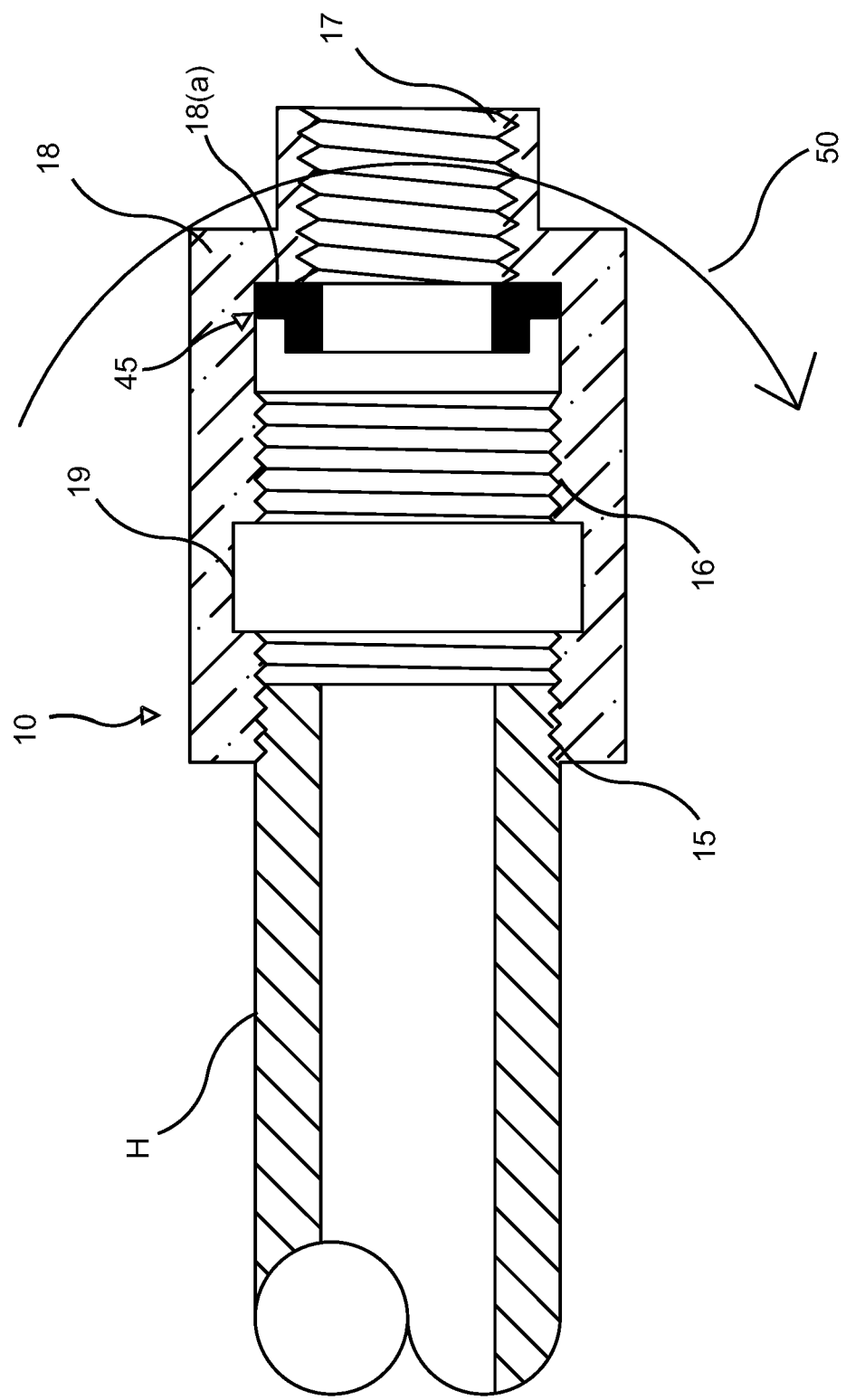
Fig: 2

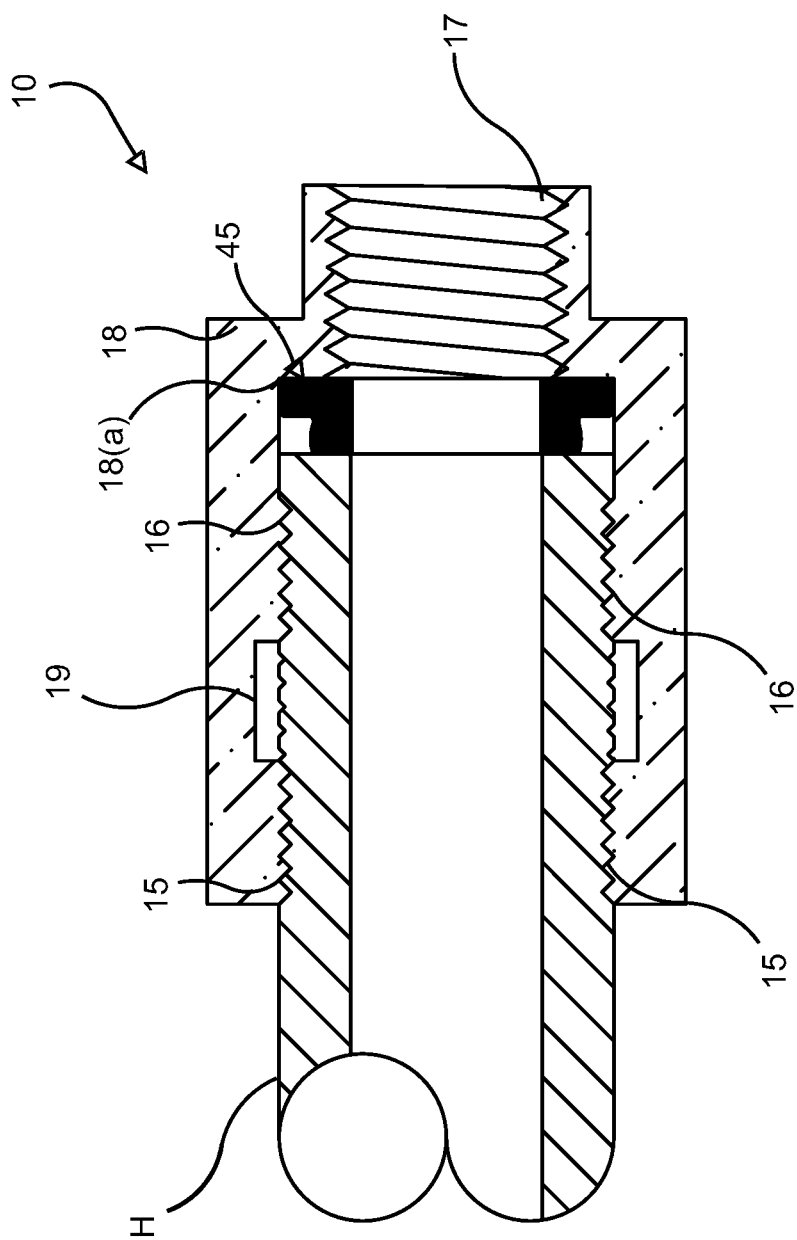
Fig: 3

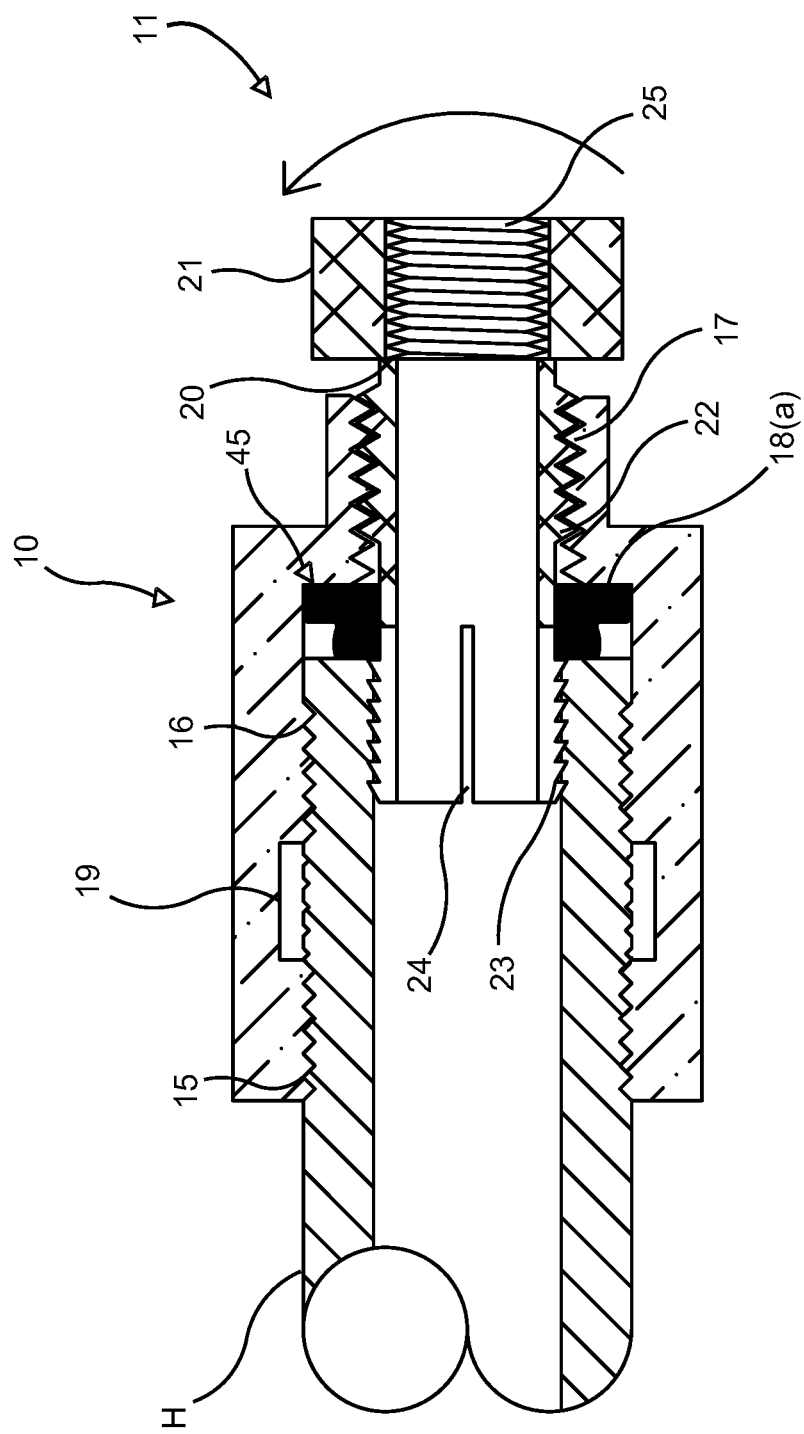
Fig: 4

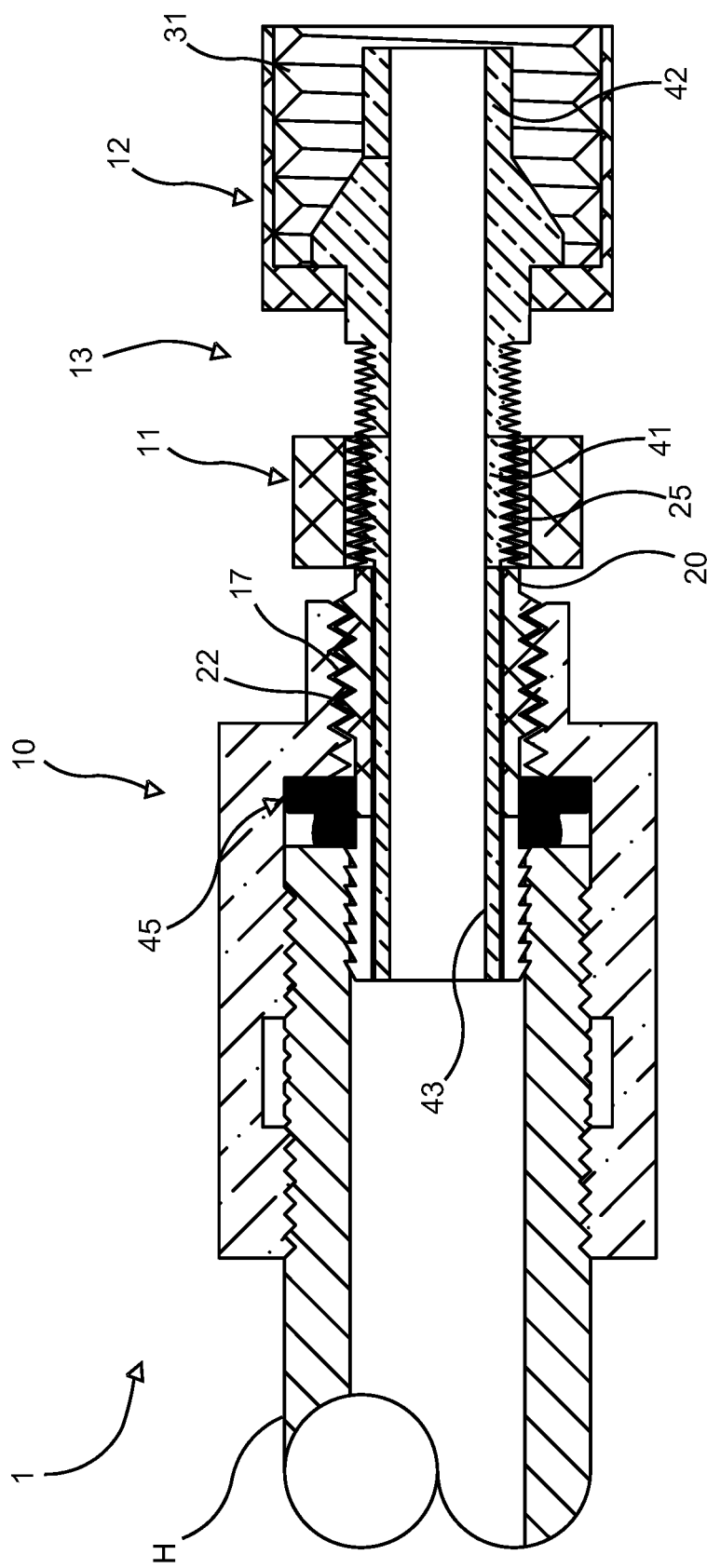
Fig: 5

HIGH PRESSURE HOSE COUPLER

FIELD OF THE INVENTION

The invention relates to coupling of high pressure pipes or hoses, such as hydraulic hoses on heavy plant for construction, industrial, farming or marine applications.

At present, many such couplers require specialist equipment for installation, typically involving crimping with large forces. This is because of the perception that such techniques are required in order for the coupler to withstand the very high pressures involved, often of the order in excess of 500 bar. It can often be very inconvenient to await the services of a specialist to visit and make repairs to broken joints, and there can be considerable down-time of valuable plant. This can often happen out-of-hours during intensive farm work, for example.

It is known to provide a hose coupler with a tubular connector and a collet for insertion within a tube end, for example in US2009/0026760, EP0369834, and CN203082417.

The invention is directed towards providing an effective coupler for high pressure hoses, which can be manually applied without need for specialist equipment.

SUMMARY OF THE INVENTION

According to the invention, there is provided a high pressure hose coupler comprising:
- a tubular connector having internal threads at a distal end for engaging a hose around the hose's external surface,
- an internal collet having a distal end configured to fit inside a hose, and a proximal end to engage the connector to be retained in place, and
- a hollow insert having a distal tube configured to be inserted within the collet to press the collet radially outwardly so that the hose wall is pressed between the connector and the collet.

In one embodiment, the connector has at least two sets of internal threads configured for gripping a hose external surface, the sets being axially spaced apart by a gap to provide space for grit or grease.

In one embodiment, the collet has external threads and the connector has internal threads for inter-engagement. In one embodiment, the distal internal threads of the connector for engaging a hose and the proximal internal threads of the connector for engaging the collet are in the opposite sense.

In one embodiment, the connector has external flats for rotation by a spanner. Preferably, the connector includes a shoulder with an internal surface configured to seal axially against an end face of a hose end. In one embodiment, the coupler further comprises an annular resilient seal configured to fit within the tubular connector and form a seal against said shoulder internal surface. Preferably, the seal comprises a proximal flange and a distally-extending sleeve.

In one embodiment, the collet has external flats for rotation by a spanner. Preferably, the collet distal tube comprises ratchet teeth for gripping a hose internal surface.

In one embodiment, the collet has in the range of 2 to 10 ratchet teeth.

In one embodiment, the collet has longitudinal slits to facilitate resilience for radial pressing outwardly. Preferably, the collet has in the range of two to eight slits.

In one embodiment, the insert proximal end is configured to engage the collet at a proximal end of the collet. Preferably, the insert comprises external threads for engaging internal threads of the collet. In one embodiment, the insert tube had a uniform external surface at its distal end, without any taper.

In one embodiment, the insert tube internal bore has a tapered internal surface at its distal end to provide a funnel shape for assistance of hydraulic flow into the tube.

In one embodiment, the insert proximal end is configured to retain a nut for connection to a fixed coupler part. In one embodiment, the nut has internal threads for engaging a fixed coupler part around said proximal end of the insert.

In one embodiment, the insert proximal end comprises a joint part of conical shape for engagement with a corresponding fixed conical joint part of a plant. Preferably, the coupler connector, collet, and insert are of metal material. Preferably, the metal is alloy steel.

In one embodiment, the insert has external flats for rotation by a spanner.

In another aspect, the invention provides a high pressure hose assembly comprising a hose and a coupler of any embodiment.

In a further aspect, the invention provides a heavy plant apparatus comprising a high pressure hose assembly of any embodiment.

Additional Statements

According to the invention, there is provided a high pressure hose coupler comprising:
- a tubular connector having internal threads at a distal end for engaging a hose around the hose's external surface,
- an internal collet having a distal end configured to fit inside a hose, and a proximal end to engage the connector to be retained in place, and
- a hollow insert having a distal end configured to be inserted within the collet to press the collet radially outwardly so that the hose wall is pressed between the connector and the collet.

In one embodiment, the connector has at least two sets of internal threads configured for gripping a hose external surface, the sets being axially spaced apart by a gap to provide space for grit or grease.

In one embodiment, the collet has external threads and the connector has internal threads for inter-engagement.

In one embodiment, the distal internal threads of the connector for engaging a hose and the proximal internal threads of the connector for engaging the collet are in the opposite sense.

In one embodiment, the connector has external flats for rotation by a spanner.

In one embodiment, the connector includes a shoulder with an internal surface configured to seal axially against an end face of a hose end.

In one embodiment, the insert proximal end is configured to engage the collet at a proximal end of the collet.

In one embodiment, the insert proximal end is configured to retain a nut for connection to a fixed coupler part.

In one embodiment, the nut has internal threads for engaging a fixed coupler part around said proximal end of the insert.

In one embodiment, the insert proximal end comprises a joint part of conical shape for engagement with a corresponding fixed conical joint part of a plant.

In one embodiment, the coupler connector, collet, and insert are of metal material.

In one embodiment, the metal is alloy steel.

In one embodiment, the collet has external flats for rotation by a spanner.

In one embodiment, the insert has external flats for rotation by a spanner.

In another aspect, the invention provides a high pressure hose assembly comprising a hose and a coupler of any embodiment.

DETAILED DESCRIPTION OF THE INVENTION

Brief Description of the Drawings

The invention will be more clearly understood from the following description of some embodiments thereof, given by way of example only with reference to the accompanying drawings in which:—

FIG. 1 is an exploded perspective view of a coupler of the invention;

FIGS. 2 and 3 are cross-sectional views showing a connector being applied around the end of a high pressure hose;

FIG. 4 is a cross-sectional view showing insertion of an internal collet within the end of the hose; and FIG. 5 is a cross-sectional view showing also an insert within the collet.

DESCRIPTION OF THE EMBODIMENTS

A coupler 1 of the invention is suitable for coupling a high pressure hose H to a plant fitting without need for a crimping or other automated tool. A tubular connector 10 surrounds the end of the hose and engages it by threads. A collet 11 is placed inside the end of the hose, and an insert 13 is inserted within the collet to press it radially outwardly, so that the hose wall is sandwiched between the connector 10 and the collet 11 in a very tight grip to withstand the pressures of over 500 bar.

The ability to effectively couple and withstand these levels of hydraulic pressure are also contributed to by the particular manner of connecting the tubular connector 10 to the hose, how the collet is secured to the tubular connector by threads at a shoulder of the connector, and how the insert is secured to the collet and acts on the collet to radially press it out.

The tubular connector 10 has at its distal end axially separated internal threads 15 and 16 for engaging a hose H around the hose's external surface. These teeth grip into the hose's outer soft layer, and the hose H it typically steel-reinforced.

An internal collet 11 distal end fits inside the hose H within the volume encompassed by the connector 10, and has a proximal end which engages the connector 10 to be retained in place.

The hollow insert 13 has a distal end tube 40 configured to be inserted within the collet 11 to press the collet radially outwardly so that the hose wall is pressed between the connector and the collet. The insert 13 proximal end has external threads 41 configured to engage collet internal threads 25.

The hose H is gripped very tightly by action of the insert 13 pressing against the tapered collet 11, in turn against the restraining force of the tubular connector around the end of the hose.

In more detail, the connector 10 has on its external surface flats 10(a) forming an hexagonal outer shape along that part which surrounds the end of the hose H, and a proximal shoulder 18. These allow the connector 10 to be conveniently rotated to engage a hose end, the threads 15 and 16 cutting into the hose external surface. The connector 10 distal end axially separated internal threads 15 and 16 are suitable for very tight and sealing gripping of a hose around the hose's outer surface. At the proximal end the connector 10 has internal threads 17 within the shoulder 18. Advantageously, the shoulder has an axially-facing face 18(a) facing in the distal direction, towards a hose end in use.

In one embodiment the part of the tubular connector between its distal end and the face 18(a) may have a tapered or frusto-conical internal shape narrowing in the proximal direction and ending at the face 18(a). The extent of this narrowing is small, for example 0.5 mm to 2 mm of a reduction in internal diameter over a length of about 4 cm for example.

There is a nut 12 for engagement of the coupler 1 with a fixed coupler component on a plant.

In one embodiment, there is also an annular axial resilient seal 45 of rubber material having a short sleeve portion 46 and a proximal flange 47. The internal diameter (ID) of the insert 13 is 10 mm, and the outside diameter (OD) is 14 mm, in one example. This is configured to engaging the connector 10 shoulder 18 end face 18(a) to seal between this face and the end face of a hose H.

The connector 10 distal threads 15 and 16 are left-handed. The axial gap between them is to provide a space 19 for any grit or grease in a manner in which it does not affect gripping of the connector onto the hose. This gripping is shown in FIGS. 2 and 3. It can be done with a manual spanner engaging the flats 10(a).

The connector 10 proximal internal threads 17 are for receiving the internal collet 11, as shown most clearly in FIG. 4. The collet 11 has external threads 22 for engaging the connector proximal internal threads 17, allowing gradual axial movement of the collet 11 into the hose H. This movement of the collet 11 is facilitated by a bolt head 21 on a shank 20 at the proximal end of the collet. At its distal end the collet 11 has tapered ratchet teeth 23 shaped for pushing in the distal direction into the hose, but to resist withdrawal. The collet 11 distal end has four equally spaced axial slits 24. At its proximal end the collet 11 has internal threads 25 within the head 21.

The insert 13 has a distal end tube 40 with a bore 43 for flow of liquid from the hose H. The insert 13 also has a conical joint part 42 at the proximal end for engaging into a corresponding fixed joint part, for example of a heavy plant such as a digger. There are external threads 41 on the distal end tube 40 for engaging the internal threads 25 of the collet 11. Advantageously, the distal end tube 40 has a distal leading face which is at right angles to the curved surface, without any external shoulder or taper. Thus the circular rim corner is suited to pressing and retaining the collet radially outwardly. There may, however, be an internal taper at the distal end of the bore, to provide a funnel-shaped internal surface to facilitate flow of oil into the insert in use.

The nut 12 engages the insert 13, being retained by its head 42. It has hexagonal flats 30 and internal threads 31 for engaging onto a plant fixed coupler part.

In use, the coupler 1 is used to affix the end of a high pressure hose H to a fixed joint part on an item such as heavy plant. The sequence is as follows:

A) Insert the axial seal 45 into the connector 10 distal end and rotate the connector 10 around the end of a hose H as indicated by the arrow 50 in FIG. 2. First the threads 15 and then the threads 16 bite into the hose outer surface. Typically, the hose is of steel re-enforced rubber construction, with an outer texture amenable to tight gripping by the threads 15 and 16. FIG. 3 shows the connecter 10 after being rotated into place. In this position an axial face 18(a) of the shoulder 18 of the connector 10 butts against the end face of the seal 45 flange 47, thereby contributing to the seal between the hose H and the connector 10. If the seal 45 is not used, the hose end face butts directly against the face 18(*a*).

If the connector has a narrowing internal diameter towards the end face 18(*a*) the hose is gripped ever more tightly during rotation to a greater extent than if it were of uniform internal diameter, and the extend of sealing is even greater.

B) As shown in FIG. 4, insert the collet 11 into the hose H end by rotation using the head 21. In this action the collet outer threads 22 engage the connector internal threads 17 in the opposite sense to engagement of the connector threads 15 and 16 onto the hose H. The hose H is then gripped both internally and externally. However, the gripping force is typically insufficient.

C) As shown in FIG. 5, this grip is tightened by insertion of the insert 13, by rotation of the head 42 at its flats. In this action there is engagement of the insert outer threads 41 and the collet internal threads 25. This action is performed with a spanner so that the insert 13 distal end tube 40 moves axially into the collet and thereby presses radially outwardly against the internal surface of the collet 11 in a rawl plug type of action to cause it to expand radially with the freedom of movement allowed by the four longitudinal slits 24. This causes the collet teeth 23 to grip more tightly into the internal fabric of the hose H.

D) The proximal end of the insert 13 is then engaged with a fixed coupler part by pressing into a conical fixed plant component with the nut 12 internal threads 31 engaging external threads of the fixed plant component.

It will be appreciated that the invention provides for manual and very effective making of joints on high pressure equipment. There are sufficient engagement forces applied because of the internal and external gripping of the hose H, augmented by the insert pressing the collet radially outwardly. The gripping on the external surface of the hose H helps to ensure that grease or dirt does not affect seal integrity, any such contamination remaining in the gap 19 between the threads 15 and 16. This extent of coupling for high pressure hoses has been achieved despite the perception that specialist crimping equipment is required for coupling such hoses due to the high pressures.

The invention is not limited to the embodiments described but may be varied in construction and detail. For example the coupler of the invention may be arranged to interconnect two hose ends, in which case it has a symmetrical configuration. The collet may have a number of slits in the range of 2 to 8 preferably, depending on the size of the hose to be coupled and hence of the coupling. Larger diameters will typically require more slits. While the collet is illustrated as having five ratchet teeth 23, it may have none or a number in the range of 1 to 10 for example, preferably two to eight. Also, it is not essential that an axial seal be inserted between the end face of the hose and the connector axial surface, although such a seal is typically advantageous because it helps to block a potential escape path for oil. Also, it is envisaged that the insert may be secured, for example by threads, directly to the connector instead of or in addition to the collet. While the connector internal and external threads have an opposite sense, this is not essential, and they could alternatively be in the same sense, and likewise the threads for engagement of the insert and the collet.

The invention claimed is:

1. A high pressure hose coupler comprising:
   a tubular connector having hose-engaging internal threads at a distal end for engaging a hose around an external surface of a hose,
   an internal collet having a distal end configured to fit inside a hose, and a proximal end to engage the connector to be retained in place, wherein the collet has longitudinal slits to facilitate resilience for radial pressing outwardly, and
   a hollow insert having a distal tube configured to be inserted within the collet to press the collet radially outwardly so that a hose wall is pressed between the connector and the collet.

2. The high pressure hose coupler as claimed in claim 1, wherein the connector has at least two sets of internal threads configured for gripping a hose external surface, the sets being axially spaced apart by a gap to provide space for grit or grease.

3. The high pressure hose coupler as claimed in claim 1, wherein the collet has connector-engaging external threads and the connector has collet-engaging internal threads for inter-engagement.

4. The high pressure hose coupler as claimed in claim 1, wherein the collet has connector-engaging external threads and the connector has collet-engaging internal threads for inter-engagement, and wherein the hose-engaging internal threads of the connector and the collet-engaging internal threads of the connector are in the opposite sense.

5. The high pressure hose coupler as claimed in claim 1, wherein the connector has external flats for rotation by a spanner.

6. The high pressure hose coupler as claimed in claim 1, wherein the connector includes a shoulder with an internal surface configured to seal axially against an end face of a hose end.

7. The high pressure hose coupler as claimed in claim 1, wherein the connector includes a shoulder with an internal surface configured to seal axially against an end face of a hose end; and wherein the coupler further comprises an annular resilient seal configured to fit within the tubular connector and form a seal against said shoulder internal surface.

8. The high pressure hose coupler as claimed in claim 1, wherein the connector includes a shoulder with an internal surface configured to seal axially against an end face of a hose end; and wherein the coupler further comprises an annular resilient seal configured to fit within the tubular connector and form a seal against said shoulder internal surface; and wherein the seal comprises a proximal flange and a distally-extending sleeve.

9. The high pressure hose coupler as claimed in claim 1, wherein the collet has external flats for rotation by a spanner.

10. The high pressure hose coupler as claimed in claim 1, wherein the collet distal end comprises ratchet teeth for gripping a hose internal surface.

11. The high pressure hose coupler as claimed in claim 1, wherein the collet distal end comprises ratchet teeth for gripping a hose internal surface; and wherein the collet has in the range of 2 to 10 ratchet teeth.

12. The high pressure hose coupler as claimed in claim 1, wherein the collet has in the range of two to eight slits.

13. The high pressure hose coupler as claimed in claim 1, wherein a proximal end of the insert is configured to engage the collet at the proximal end of the collet.

14. The high pressure hose coupler as claimed in claim 1, wherein a proximal end of the insert is configured to engage the collet at the proximal end of the collet; and wherein the insert comprises external threads for engaging internal threads of the collet.

15. The high pressure hose coupler as claimed in claim 1, wherein the insert tube distal end has a uniform external surface, without any taper.

16. The high pressure hose coupler as claimed in claim 1, wherein the insert tube distal end has an internal bore with a tapered internal surface to provide a funnel shape for assistance of hydraulic flow into the tube.

17. The high pressure hose coupler as claimed in claim 1, wherein a proximal end of the insert is configured to retain a nut for connection to a fixed coupler part.

18. The high pressure hose coupler as claimed in claim 1, wherein a proximal end of the insert is configured to retain a nut for connection to a fixed coupler part; and wherein the nut has internal threads for engaging a fixed coupler part around said proximal end of the insert.

19. The high pressure hose coupler as claimed in claim 1, wherein the insert proximal end comprises a joint part of conical shape for engagement with a corresponding fixed conical joint part of a plant.

20. The high pressure hose coupler as claimed in claim 1, wherein the connector, the collet, and the insert are of metal material.

21. The high pressure hose coupler as claimed in claim 1, wherein the connector, the collet, and the insert are of metal material; and wherein the metal is alloy steel.

22. The high pressure hose coupler as claimed in claim 1, wherein the insert has external flats for rotation by a spanner.

23. A high pressure hose assembly comprising a hose and a coupler as claimed in claim 1.

24. A heavy plant apparatus comprising a high pressure hose assembly as claimed in claim 23.

25. A high pressure hose coupler comprising:
a tubular connector having hose-engaging internal threads at a distal end for engaging a hose around an external surface of a hose,
an internal collet having a distal end configured to fit inside a hose, and a proximal end to engage the connector to be retained in place, and
a hollow insert having a distal tube configured to be inserted within the collet to press the collet radially outwardly so that a hose wall is pressed between the connector and the collet,
wherein the collet has connector-engaging external threads and the connector has collet-engaging internal threads for inter-engagement.

* * * * *